United States Patent
Fukuhara et al.

(10) Patent No.: US 10,227,476 B2
(45) Date of Patent: *Mar. 12, 2019

(54) PREPREG, FIBER-REINFORCED COMPOSITE MATERIAL, METHOD FOR PRODUCING SAME, AND EPOXY RESIN COMPOSITION

(71) Applicant: Mitsubishi Chemical Corporation, Chiyoda-ku (JP)

(72) Inventors: Yasuhiro Fukuhara, Toyohashi (JP); Hisaya Ushiyama, Toyohashi (JP); Manabu Kaneko, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 704 days.

This patent is subject to a terminal disclaimer.

(21) Appl. No.: 14/352,591

(22) PCT Filed: Nov. 29, 2012

(86) PCT No.: PCT/JP2012/080950
§ 371 (c)(1),
(2) Date: Apr. 17, 2014

(87) PCT Pub. No.: WO2013/081058
PCT Pub. Date: Jun. 6, 2013

(65) Prior Publication Data
US 2014/0273693 A1    Sep. 18, 2014

(30) Foreign Application Priority Data

Nov. 29, 2011   (JP) .................................. 2011-260732
Nov. 29, 2011   (JP) .................................. 2011-260733

(51) Int. Cl.
| | |
|---|---|
| C08K 7/06 | (2006.01) |
| C08J 5/24 | (2006.01) |
| B29D 7/01 | (2006.01) |
| C08L 63/00 | (2006.01) |
| B29C 70/02 | (2006.01) |
| C08G 59/30 | (2006.01) |
| C08G 59/50 | (2006.01) |
| B29C 70/46 | (2006.01) |

(52) U.S. Cl.
CPC .............. C08K 7/06 (2013.01); B29C 70/021 (2013.01); B29D 7/01 (2013.01); C08G 59/302 (2013.01); C08G 59/5073 (2013.01); C08J 5/24 (2013.01); C08L 63/00 (2013.01); B29C 70/46 (2013.01); C08J 2363/00 (2013.01); C08L 2205/02 (2013.01); Y10T 442/2951 (2015.04)

(58) Field of Classification Search
CPC .................................. C08L 63/00; C08K 7/06
See application file for complete search history.

(56) References Cited

U.S. PATENT DOCUMENTS

| | | | |
|---|---|---|---|
| 5,464,910 A | 11/1995 | Nakatsuka et al. | |
| 6,447,915 B1* | 9/2002 | Komiyatani | H05K 3/4655 156/330 |
| 2003/0166796 A1* | 9/2003 | Imaizumi | C08G 59/50 525/534 |
| 2008/0200636 A1* | 8/2008 | Nakanishi | C08L 63/00 528/105 |
| 2009/0030147 A1 | 1/2009 | Takahata et al. | |
| 2009/0302462 A1* | 12/2009 | Hosomi | B32B 5/26 257/734 |
| 2011/0083890 A1* | 4/2011 | Tanaka | C08G 59/4014 174/258 |
| 2011/0319525 A1 | 12/2011 | Maeda et al. | |
| 2012/0202071 A1 | 8/2012 | Kaneko et al. | |

FOREIGN PATENT DOCUMENTS

| | | |
|---|---|---|
| EP | 1 566 394 A1 | 8/2005 |
| EP | 2 412 741 A1 | 2/2012 |
| JP | 10 95048 | 4/1998 |
| JP | 10 128778 | 5/1998 |

(Continued)

OTHER PUBLICATIONS

International Search Report dated Mar. 19, 2013 in PCT/JP12/080950 Filed Nov. 29, 2012.
Office Action dated Feb. 1, 2016 in co-pending U.S. Appl. No. 14/351,387.
U.S. Appl. No. 14/351,387, filed Apr. 11, 2014, Fukuhara, et al.
International Search Report dated Mar. 19, 2013 in PCT/JP2012/080956 (with English language translation).

(Continued)

Primary Examiner — Megan McCulley
(74) Attorney, Agent, or Firm — Oblon, McClelland, Maier & Neustadt, L.L.P.

(57) ABSTRACT

The present invention pertains to a prepreg containing reinforcing fibers and an epoxy resin composition. Said prepreg is sandwiched between dies preheated to 140.degree.C. and pressurized to MPa and held for five minutes at this temperature to obtain a cured article having a G'Tg of at least 150.degree.C. The present invention also pertains to a fiber-reinforced composite material and a method for producing same. According to this invention, it is possible to provide a prepreg which is well suited to press-molding, particularly to high-cycle press-molding. It is also possible to provide a fiber-reinforced composite material which can be heat-cured at a lower temperature and over a shorter time than conventional methods, with which it is possible to minimize excessive flow of resin in hot-press curing, and which is resistant to performance defects such as fiber meandering and defects in surface appearance. A method for producing the same can also be provided.

11 Claims, 1 Drawing Sheet

(56) References Cited

FOREIGN PATENT DOCUMENTS

| | | |
|---|---|---|
| JP | 2002 159613 | 6/2002 |
| JP | 2004-307648 A | 11/2004 |
| JP | 2005 213352 | 8/2005 |
| JP | 2007 197706 | 8/2007 |
| JP | 2007 246668 | 9/2007 |
| JP | 2009-292976 A | 12/2009 |
| JP | 2009-292977 A | 12/2009 |
| JP | 2011 116843 | 6/2011 |
| JP | 2012 92297 | 5/2012 |
| WO | 2004 048435 | 6/2004 |
| WO | WO 2011/037239 A1 | 3/2011 |

OTHER PUBLICATIONS

Extended European Search Report dated Mar. 12, 2015 in Patent Application No. 12852841.1.
Partial Supplementary European Search Report dated Apr. 21, 2015 in Patent Application No. 12852529.2.

\* cited by examiner

PREPREG, FIBER-REINFORCED COMPOSITE MATERIAL, METHOD FOR PRODUCING SAME, AND EPOXY RESIN COMPOSITION

TECHNICAL FIELD

The present invention relates to a prepreg suitable for compression molding, fiber-reinforced composite material using the prepreg, and to a method for producing the same. Also, the present invention relates to an epoxy resin composition suitable for making such a prepreg. The present application is based upon and claims the benefit of priority to Japanese Patent Application Nos. 2011-260732 and 2011-260733, filed Nov. 29, 2011. The entire contents of these applications are incorporated herein by reference.

FIELD OF THE INVENTION

Because of their excellent mechanical properties, carbon-fiber reinforced composite materials made of carbon fiber and matrix resin are widely employed in aviation, automotive and industrial applications. In recent years, as the excellence of their performance in a variety of applications has become widely acknowledged, carbon-fiber reinforced composite materials have gained even wider use. The matrix resin for such a composite material is required to exhibit excellent molding capability and high mechanical strength in high temperature ambience. Since thermosetting resins are excellent in impregnation and heat tolerance, they are suitable as matrix resins. Examples of thermosetting resins are phenolic resins, melamine resins, bismaleimide resins, unsaturated polyester resins, epoxy resins and the like. Among those, epoxy resins are widely used because they offer excellent heat tolerance and moldability, and are capable of providing mechanical strength when used in carbon-fiber composite materials.

Methods for forming fiber reinforced plastics (FRPs) made of reinforced fiber and matrix resin (hereinafter may also be referred to as "fiber-reinforced composite material") are, for example, using an autoclave as described in patent publication 1, using a vacuum bag as described in patent publication 2, compression molding described in patent publication 3, and the like.

However, using the methods described in patent publications 1~3, after prepreg is laminated and molded into a desired shape, thermosetting treatment is required at a temperature of approximately 160° C. or higher for about 2~6 hours. Namely, high temperature and long treatment time are required when methods in patent publications 1~3 are employed.

On the other hand, high-cycle compression molding undertaken in high temperature and under high pressure described in patent publication 4 is known as a molding method widely used in automotive applications because of its high productivity.

To achieve volume production using high-cycle compression molding, curing is required to be completed at a relatively low temperature, that is, at approximately 100~150° C., from roughly a few minutes to 30 minutes.

At that time, if the glass transition temperature of the cured matrix resin is high, even when a thermoset molded body is taken out of the mold without being cooled, the molded body will not deform. Thus, the molding cycle is further shortened. As a result, cured matrix resin is required to have an even higher glass transition temperature.

Also, by raising the glass transition temperature of a matrix resin, since the molded body does not deform even under a high temperature for bake coating, wider coating conditions are available for the thermoset molded body. For such a reason as well, cured matrix resins are required to show an even higher glass transition temperature.

Also, by raising the glass transition temperature of the matrix resin, the molded body will not deform even when the bake-coating temperature is set high. Thus, wider coating conditions can be employed for the cured molded body. For such a reason as well, cured matrix resin is required to have a higher glass transition temperature.

When the glass transition temperature of the matrix resin is high, it is known that the fiber-reinforced composite material exhibits high mechanical strength under high temperature ambience.

When a prepreg containing a thermosetting resin as its matrix is high-cycle compression molded, the resin viscosity may occasionally be significantly lowered as the resin temperature of the prepreg rises. In such a case, depending on the structure of a molding die, a significant amount of resin flows out, thus causing molding problems: for example, a defective exterior appearance caused by insufficient resin on the surface of the obtained molded product; failed performance due to fiber meandering and the like; or mechanical problems of a die due to resin flowing into the ejector pins, air valves and the like in the die. Therefore, when a prepreg containing a thermosetting resin as the matrix is high-cycle compression molded, it is necessary to adjust the resin outflow in a die so as to improve quality and productivity.

Patent publication 5 discloses a method for using a high-viscosity epoxy resin as the matrix resin, and a method for adjusting resin outflow by adding a thermoplastic resin to the epoxy resin.

However, when a high-viscosity epoxy resin is used as described in patent publication 5, resin viscosity at room temperature (25° C.) also increases. Thus, the ease of handling of the prepreg decreases significantly when the prepreg is laminated or the like at room temperature. Also, a method for adding a general-purpose thermoplastic resin to epoxy resin is difficult to apply to high-cycle compression molding, since a thermoplastic resin has a low solubility in the epoxy resin, and causes a lowered glass transition temperature (hereinafter also referred to as "Tg"), decreased curing speed and the like in the obtained epoxy resin composition.

PRIOR ART PUBLICATION

Patent Publication patent publication 1: Japanese Published Unexamined Patent Application H10-128778
patent publication 2: Japanese Published Unexamined Patent Application 2002-159613
patent publication 3: Japanese Published Unexamined Patent Application H10-95048
patent publication 4: Japanese Publication of PCT Application 2004/48435
patent publication 5: Japanese Published Unexamined Patent Application 2005-213352

SUMMARY OF THE INVENTION

Problem(s) to be Solved by the Invention

An objective of the present invention is to provide a prepreg which is made of a reinforcing fiber and epoxy resin composition and is suitable for compression molding, particularly suitable for high-cycle compression molding; a prepreg which contains an epoxy resin composition that exhibits excellent storage stability at room temperature, a shorter thermosetting time at relatively low temperatures, and high heat tolerance in cured resin; and a prepreg which is capable of suppressing excessive resin outflow during compression thermosetting. Also, another objective of the present invention is to provide a fiber-reinforced composite material using the prepreg and a method for producing such a fiber-reinforced composite material at high yield.

Mode to Carry Out the Invention

The inventors of the present invention have carried out intensive study to solve the above problems and found solutions to the problems in a prepreg made of reinforcing fiber and an epoxy resin composition, and whose cured product exhibits a G'Tg of 150° C. or higher when the prepreg is pressed and kept for 5 minutes in a die preheated at 140° C. under a pressure of 1 MPa.

In addition, the inventors of the present invention have found that the above problems are solved even more preferably by a prepreg containing reinforcing fiber and an epoxy resin composition having the following components.

Namely, an epoxy resin composition contains the following components (A) and (B) and at least either component (C) or component (D).

Component (A): an epoxy resin that does not include a sulfur atom in the molecule.

Component (B): an imidazole compound with the structure represented by formula (1) below.

Component (C): an imidazole compound with the structure represented by formula (2) below.

Component (D): an epoxy resin that includes at least one sulfur atom in the molecule.

[chemical formula 1]

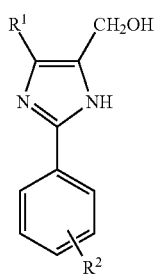

(1)

(In the formula, $R^1$ indicates an alkyl group or a hydroxymethyl group, and $R^2$ indicates an alkyl group or a hydrogen atom.)

[chemical formula 2]

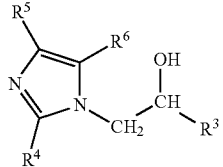

(2)

(In the formula, $R^3$ indicates an organic group containing at least one carbon atom, and $R^4 \sim R^6$ indicate a hydrogen atom, a methyl group or an ethyl group.)

Namely, the present invention relates to the following.

[1] A prepreg containing a reinforcing fiber and an epoxy resin composition; G'Tg of the cured material of the prepreg is 150° C. or higher when the prepreg is pressed and kept for 5 minutes in a die preheated at 140° C. under a pressure of 1 MPa.

[2] The prepreg described in [1], in which the epoxy resin composition contains component (A), Component (B) and at least either component (C) or component (D).

Component (A): an epoxy resin that does not include a sulfur atom in the molecule.

Component (B): an imidazole compound represented by formula (1) below.

Component (C): an imidazole compound represented by formula (2) below.

Component (D): an epoxy resin that includes at least one sulfur atom in the molecule.

[chemical formula 3]

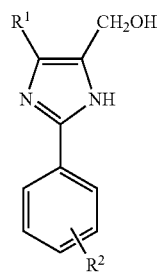

(1)

(In the formula, $R^1$ indicates a straight-chain or branched-chain alkyl group or hydroxymethyl group having 1~5 carbon atoms, and $R^2$ indicates a hydrogen atom or a straight-chain or branched-chain alkyl group having 1~5 carbon atoms.)

[chemical formula 4]

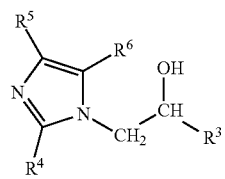

(2)

(In the formula, $R^3$ indicates an organic group containing at least one carbon atom, and $R^4 \sim R^6$ indicate a hydrogen atom, a methyl group or an ethyl group.)

[3] The prepreg described in [1] or [2], in which component (A) is an epoxy resin containing at least one selected from among the following group: bisphenol A epoxy resin, bisphenol F epoxy resin, biphenyl epoxy resin, dicyclopentadiene epoxy resin, epoxy resin with a naphthalene skeleton, isocyanate-modified epoxy resin with an oxazolidone ring, phenol novolac epoxy resin, cresol epoxy resin, glycidylamine epoxy resin, glycidylether epoxy resin, modified epoxy resin of the above epoxy resins, and brominated epoxy resin.

[4] The prepreg described in any one of [1]~[3], in which $R^3$ of component (C) is preferred to be a group having the structure of —$CH_2R^7$ or —$CH_2OR^7$ (here, $R^7$ indicates an organic group having at least one carbon atom), or a group having the structure of —$CH_2OR^8$ (here, $R^8$ indicates an aryl group that may contain a substituent.)

[5] The prepreg described in any one of [1]~[4], in which the amount of component (B) in the epoxy resin composition is set at 2~40 parts by mass based on the total 100 parts by mass of component (A) and component (D).

[6] The prepreg described in any one of [1]~[5], in which the amount of component (B) in the epoxy resin composition is set at 3~25 parts by mass based on the total 100 parts by mass of component (A) and component (D).

[7] The prepreg described in any one of [1]~[6], in which the amount of component (B) in the epoxy resin composition is set at 3~15 parts by mass based on the total 100 parts by mass of component (A) and component (D).

[8] The prepreg described in any one of [1]~[7], in which the epoxy resin composition contains component (A), component (B) and at least component (C), and component (C) is an imidazole compound encapsulated in microcapsules.

[9] The prepreg described in [8] above, in which the amount of component (C) in the epoxy resin composition is set at 1~6 parts by mass based on total 100 parts by mass of component (A) and component (D).

[10] The prepreg described in [8] above, in which the amount of component (C) in the epoxy resin composition is set at 1.5~4 parts by mass based on total 100 parts by mass of component (A) and component (D).

[11] The prepreg described in any one of [1]~[10], in which the epoxy resin composition contains component (A), component (B) and at least component (D), and the mass ratio of component (A) to component (D) in the epoxy resin composition is set at 95:5~10:90.

[12] The prepreg described in any one of [1]~[11], in which the mass ratio of component (A) to component (D) in the epoxy resin composition is set at 80:20~12:88.

[13] The prepreg described in any one of [1]~[12], in which the mass ratio of component (A) to component (D) in the epoxy resin composition is set at 60:40~13:87.

[14] The prepreg described in any one of [11]~[13], in which component (D) includes the structure represented by formula (3) below in the molecule.

[chemical formula 5]

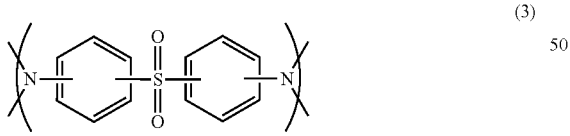

(3)

[15] The prepreg described in any one of [11]~[14], in which component (D) includes the structure represented by formula (4) below.

[chemical formula 6]

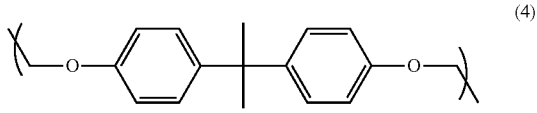

(4)

[16] The prepreg described in any one of [11]~[15], in which component (D) contains a reaction product of an epoxy resin and an amine compound having at least one sulfur atom in the molecule.

[17] The prepreg described in any one of [1]~[16], in which the epoxy resin composition contains component (C) and component (D).

[18] A fiber-reinforced composite material obtained by curing the prepreg described in any one of [1]~[17].

[19] A method for producing a fiber-reinforced composite material that includes a step for keeping the prepreg described in any one of [1]~[17] in a die for 1~20 minutes under a temperature of 100~150° C. and a pressure of 1~15 MPa.

[20] An epoxy resin composition: when the prepreg obtained by impregnating a reinforcing fiber bundle with the epoxy resin composition is pressed and kept for 5 minutes in a die preheated at 140° C. under a pressure of 1 MPa, the G'Tg of the obtained cured product is 150° C. or higher.

Effects of the Invention

According to an embodiment of the present invention, a prepreg suitable for compression molding, especially for high-cycle compression molding, is obtained. Furthermore, a prepreg is obtained, which exhibits excellent storage stability at room temperature, and a shorter thermosetting time at a relatively low temperature, and which has high heat tolerance when cured.

Furthermore, since the fiber-reinforced composite material produced using the prepreg of the present invention is capable of suppressing excessive resin outflow during compressed thermosetting of the prepreg, defective quality such as poor exterior appearance, fiber meandering and the like is less likely to occur. Accordingly, a manufacturing method for a fiber-reinforced composite material is provided with high productivity.

DETAILED DESCRIPTIONS OF THE PREFERRED EMBODIMENTS

Figure 1A:
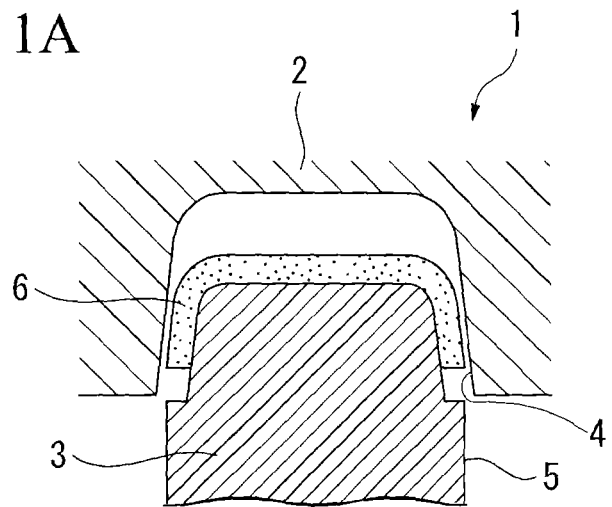
FIG. 1A is a cross-sectional view showing an open state of a compression-molding die for producing a fiber-reinforced composite material formed using an epoxy resin composition related to the present invention.

In the following, preferred embodiments of the present invention are described. However, the present invention is not limited to those embodiments.

According to the gist of the present invention, a prepreg contains a reinforcing fiber and an epoxy resin composition, and when the prepreg is pressed and kept for 5 minutes in a die preheated at 140° C. at a pressure of 1 MPa, the G'Tg of the cured product is 150° C. or higher.

The prepreg according to an embodiment of the present invention contains a reinforcing fiber and an epoxy resin composition. The epoxy resin composition is not limited specifically, but it is preferred to use such an epoxy resin composition that when a prepreg is prepared by impregnating the epoxy resin composition into a reinforcing fiber bundle, and when the prepreg is pressed and kept for 5 minutes in a die preheated at 140° C. at a pressure of 1 MPa, the G'Tg of the cured product is 150° C. or higher. In addition, it is more preferred for a G'Tg measured under the above conditions to be 160° C. or higher, since flexibility increases in setting bake-coating conditions of the fiber-reinforced composite material; namely, bake-coating at 140° C., for example, can be employed.

As for such an epoxy resin composition, the composition is preferred to contain component (A) and component (B), and at least either component (C) or component (D).

Component (A): an epoxy resin that does not include a sulfur atom in the molecule.

Component (13): an imidazole compound with a structure represented by formula (1) below.

Component (C): an imidazole compound with a structure represented by formula (2) below.

Component (D): en epoxy resin that includes at least one sulfur atom in the molecule.

[chemical formula 7]

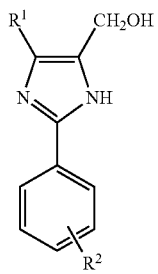

(1)

(In the formula, $R^1$ indicates a straight-chain or branched-chain alkyl group or hydroxymethyl group having 1~5 carbon atoms, and $R^2$ indicates a hydrogen atom or a straight-chain or branched-chain alkyl group having 1~5 carbon atoms.)

[chemical formula 8]

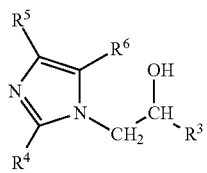

(2)

(In the formula, $R^3$ indicates an organic group containing at least one carbon atom, and $R^4$~$R^6$ indicate a hydrogen atom, a methyl group or an ethyl group.)

In component (C), namely, an imidazole compound represented by formula (2), $R^3$ is preferred to be a group having the structure of —$CH_2R^7$ or —$CH_2OR^7$ (here, $R^7$ indicates an organic group having at least one carbon atom), or it is more preferred to be a group having the structure of —$CH_2OR^8$ (here, $R^8$ indicates an aryl group that may contain a substituent.)

<Epoxy Resin Composition>
(Component A)

Regarding the prepreg according to a preferred embodiment of the present invention, the epoxy resin composition is preferred to contain component (A) and component (B), and at least either component (C) or component (D). At least one or more types of epoxy resins that do not include a sulfur atom in the molecule are used as component (A). Examples of epoxy resins used as component (A) in the present embodiment are bifunctional epoxy resins such as bisphenol A epoxy resin, bisphenol F epoxy resin, biphenyl epoxy resin, dicyclopentadiene epoxy resin, epoxy resin with a naphthalene skeleton, or modified epoxy resins of the above, such as isocyanate-modified epoxy resin with an oxazolidone ring; trifunctional or higher polyfunctional epoxy resins such as phenol novolac epoxy resin, cresol epoxy resin, glycidylamine epoxy resins such as tetraglycidyl diaminodiphenylmethane and triglycidylaminophenol, glycidylether epoxy resins such as tetrakis(glycidyloxyphenyl)ethane, tris(glycidyloxyphenyl)methane and methylenebis(diglycidyloxy)naphthalene, modified epoxy resins of the above epoxy resins, and brominated epoxy resins which are the bromides of the above epoxy resins. Also, component (A) may be prepared by combining two or more of the above epoxy resins.

Among those listed above, bisphenol A epoxy resin, bisphenol F epoxy resin, phenol novolac epoxy resin, and cresol novolac epoxy resin are especially preferred. The molecular weight of such epoxy resins is preferred to be 200~3000, more preferably 300~2000. The molecular weight of 200~3000 is preferred, since it is easier to produce epoxy resin compositions. Here, a molecular weight means the weight average molecular weight in terms of polystyrene measured by gel permeation chromatography.

In addition, the epoxy equivalent weight of an epoxy resin used as component (A) is preferred to be 50~1000 g/eq, more preferably, 90~700 g/eq. The epoxy equivalent weight of the epoxy resin used as component (A) is preferred to be 50~1000 g/eq, because the crosslinking structure of the cured product is homogeneous. Here, the epoxy equivalent weight means the molecular weight of an epoxy resin per epoxy group.

Compared with a case where epoxy resins with a highly rigid molecular structure are used as component (A), when bisphenol A epoxy resin, bisphenol F epoxy resin, phenol novolac epoxy resin, cresol novolac epoxy resin or the like is used as component (A), an additional effect of enhanced mechanical strength is obtained in the molded product, namely, the fiber-reinforced composite material containing the epoxy resin composition of the present embodiment as its matrix resin. That is because when epoxy resins with a highly rigid molecular structure are cured in a short period of time to generate a high-density crosslinking structure, distortion tends to occur in the crosslinking mesh structure, whereas, when epoxy resins listed above are used as component (A), such problems are less likely to occur.
(Component B)

In a preferred embodiment of the prepreg according to the present invention, component (B) is an imidazole compound represented by formula (1) below.

[chemical formula 9]

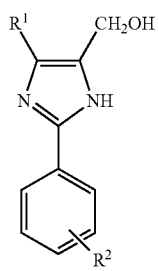

(1)

(In the formula, $R^1$ indicates a straight-chain or branched-chain alkyl group or hydroxymethyl group having 1~5 carbon atoms, and $R^2$ indicates a hydrogen atom or a straight-chain or branched-chain alkyl group having 1~5 carbon atoms.)

Such an imidazole compound works as a curing agent of the epoxy resin, and is capable of curing an epoxy resin composition in a shorter period of time when it is combined with component (C) or component (D) and mixed into the epoxy resin composition.

Examples of an imidazole compound represented by formula (1) above to be used as component (B) are an imidazole compound obtained by substituting a hydrogen in the 5-position of 1H-imidazole with a hydroxymethyl group and substituting a hydrogen in the 2-position of 1H-imidazole with a phenyl group or a toluic group, such as 2-phenyl-4,5-dihydroxymethyl imidazole, 2-phenyl-4-methyl-5-hydroxymethyl imidazole, 2-phenyl-4-benzyl-5-hydroxymethyl imidazole, 2-para-toluic-4-methyl-5-hydroxymethyl imidazole, 2-meta-toluic-4-methyl-5-hydroxymethyl imidazole, 2-meta-toluic-4,5-dihydroxymethyl imidazole, 2-para-toluic-4,5-dihydroxymethyl imidazole, and the like. Among those, the following are more preferred: 2-phenyl-4,5-dihydroxymethyl imidazole, 2-phenyl-4-methyl-5-hydroxymethyl imidazole, 2-para-toluic-4-methyl-5-hydroxymethyl imidazole, 2-meta-toluic-4-methyl-5-hydroxymethyl imidazole, 2-meta-toluic-4,5-dihydroxymethyl imidazole, and 2-para-toluic-4,5-dihydroxymethyl imidazole. Also, two or more such imidazole compounds may be combined to be used as component (B).

In a preferred embodiment of the prepreg according to the present invention, it is preferred to use an epoxy resin composition in which the amount of component (B) in the epoxy resin composition is set at 2~40 parts by mass, more preferably, 3~25 parts by mass, even more preferably, 3~15 parts by mass, based on 100 parts by mass of the epoxy resin (component (A), or the sum of component (A) and component (D) when component (D) is included). The amount of component (B) is preferred to be no less than 2 parts by mass, since curing reactions of the epoxy resin composition are facilitated and the cured resin shows high heat tolerance.

Furthermore, the imidazole compound represented by formula (1) above is a crystalline solid at room temperature (25° C.), and has a low solubility in an epoxy resin at a temperature of 100° C. or lower. Thus, as component (B), it is preferred to be powder with an average volume particle diameter of no greater than 100 μm, more preferably no greater than 20 μm. The average volume particle diameter of component (B) is preferred to be no greater than 100 μm, since component (B) is dispersed well into the epoxy resin composition and curing reactions are facilitated.

(Component C)

In a preferred embodiment of the prepreg according to the present invention, component (C) is an imidazole compound represented by formula (2) below.

[chemical formula 10]

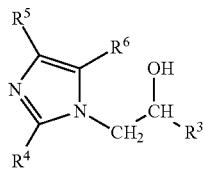

(2)

(In the formula, $R^3$ indicates an organic group containing at least one carbon atom, and $R^4$~$R^6$ indicate a hydrogen atom, a methyl group or an ethyl group.)

In the above, $R^3$ is preferred to be a group having the structure of —$CH_2R^7$ or —$CH_2OR^7$ (here, $R^7$ indicates an organic group having at least one carbon atom), or it is especially preferred to be a group having the structure of —$CH_2OR^8$ (here, $R^8$ indicates an aryl group that may contain a substituent.)

Such an imidazole compound works as a low-temperature curing agent for the epoxy resin, and is capable of curing an epoxy resin composition in a shorter period of time when combined with component (B) and mixed into the epoxy resin composition. When high-cycle compression molding is performed, the resin viscosity is usually lowered as the resin temperature of the prepreg rises. Thus, depending on the structure of a die, a significant amount of resin may flow out from the die. However, regarding the prepreg containing component (C) in the epoxy resin composition according to the present embodiment, curing reactions start at a low temperature, namely, at 70~110° C., and crosslinking reactions of the epoxy resin composition make rapid progress at an early stage of the temperature rise of resin in the prepreg, that is, while the resin temperature of the prepreg is still in a low range, at approximately 70~110° C. Thus, the resin viscosity is kept from decreasing, and resin is prevented from flowing out from the die.

Examples of an imidazole compound as component (C) represented by formula (2) above are 1-(2-hydroxy-3-phenoxy propyl)-2-methylimidazole, an adduct compound obtained by reacting glycidyl ether epoxy resin and 2-methylimidazole. Especially, an adduct compound obtained by reacting aryl glycidyl ether epoxy resin and 2-methylimidazole is preferred since excellent physical properties are achieved for the cured product of the epoxy resin composition. Also, two or more types of imidazole compounds may be combined for use as component (C).

Component (C) is preferred to be capable of curing the epoxy resin composition at 100° C. or lower, while it shows thermal latency. "Thermal latency" means it has a property that blocks reactions with an epoxy resin before thermal history is added, but after thermal history is added at a predetermined temperature or higher for a predetermined time or longer, high reactivity with an epoxy resin is exhibited even at a lower temperature.

In the present embodiment, component (C) is preferred to be a latent curing agent encapsulated in microcapsules and dispersed in an epoxy resin. More preferably, the coating film of the microcapsules is made of a crosslinked polymer. Here, the epoxy resin into which component (C) is dispersed may be the same as or different from component (A) or component (D) in the present embodiment. Such an epoxy resin is preferred to be bisphenol A epoxy resin or bisphenol F epoxy resin from the viewpoint of the stability of microcapsules.

The method for encapsulating component (C) in microcapsules is not limited specifically, but interfacial polymerization, in situ polymerization, or phase separation from an organic solvent system is preferred to obtain a homogeneous shell layer of microcapsules.

Curing capability of component (C), namely, the temperature at which it can cure an epoxy resin composition, is determined by the following procedure. First, 100 parts by mass of a liquid type bisphenol A epoxy resin having an epoxy equivalent weight of 184~194 g/eq (for example, jER 828, made by Mitsubishi Chemical Corp.) is homogeneously mixed with 7 parts by mass of component (C) to prepare an epoxy resin composition containing component (C). Then, the epoxy resin composition is cured in a differential scanning calorimeter (hereinafter referred to as a DSC) at a programmed rate of temperature rise of 10° C./min. to observe its thermal behavior. On the DSC chart of the epoxy resin composition, the temperature at a point (exothermic initiation temperature), namely, when the exothermic curve is separated from the base line and the tangent line is crossed with the base line at the first inflection point, is 100° C. or lower, component (C) is determined to have a curing capability at 100° C. or lower. In the same manner, when the exothermic curve separated from the base line on the DSC chart, and the exothermic initiation temperature is 90° C. or lower, component (C) is determined to have a curing capability at 90° C. or lower.

In a preferred embodiment of the present invention, a low-temperature curing agent with a curing capability at 90° C. or lower is preferred to be used as component (C).

As for a curing agent masterbatch with a curing capability at 100° C. or lower prepared by dispersing component (C) encapsulated in microcapsules into an epoxy resin so that component (C) is preferably mixed into an epoxy resin composition, curing agent masterbatches such as Novacure HX-3721, HX-3722, HX-3742, HX-3748 and the like, made by Asahi Kasei E-Materials Corp., may be used. However, those are not the only options, and any other material may also be used.

In the present application, the amount of component (C) in an epoxy resin composition is preferred to be 1~6 parts by mass, more preferably 1.5~4 parts by mass, based on 100 parts by mass of the epoxy resin in the epoxy resin composition (component (A), or the sum of component (A) and component (D) when component (D) is also contained). The amount of component (C) of no less than 1 part by mass is preferred, since the epoxy resin composition makes rapid reaction progress, thus suppressing resin outflow while curing.

(Component D)

In a preferred embodiment of the prepreg according to the present invention, component (D) is an epoxy resin containing at least one sulfur atom in the molecule. Examples of an epoxy resin containing at least one sulfur atom in the molecule are bisphenol S epoxy resin, epoxy resins with a thio skeleton and the like, which are preferably used as component (D) in the present embodiment. Also, epoxy resins including the structure represented by formula (3) below may also be used as component (D). Examples of such an epoxy resin are reaction products of an epoxy resin and an amine compound having at least one sulfur atom in the molecule. Namely, component (D) may include a reaction product of an epoxy resin and an amine compound having at least one sulfur atom in the molecule.

[chemical formula 11]

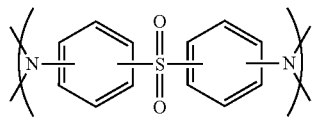

(3)

Examples of an amine compound having at least one sulfur atom in the molecule are 4,4'-diaminodiphenylsulfone, 3,3'-diaminodiphenylsulfone, 4,4'-diaminodiphenyl sulfide, bis(4-(4-aminophenoxy)phenyl)sulfone, bis(4-(3-aminophenoxy)phenyl)sulfone, 4,4'-diaminodiphenyl sulfide, and their derivatives. Among those, it is preferred to use diaminodiphenylsulfone, more preferably 4,4'-diaminodiphenylsulfone, considering heat tolerance of the cured resin.

As for the epoxy resin to be reacted with the amine compounds above, it may be the same or different from component (A).

A reaction product of an epoxy resin and an amine compound having at least one sulfur atom in the molecule is obtained by a reaction method such as combining an epoxy resin and an amine compound having at least one sulfur atom in the molecule such as the one represented by formula (3) above at a ratio of 100:3~100:30, preferably 100:5~100:20, and then heating in a temperature range of 130~200° C., preferably 140~170° C. When such a reaction method is used, unreacted epoxy resins or amine compounds may remain in the reaction product. However, it is not necessary to remove such residues.

In a preferred embodiment of the prepreg of the present invention, a reaction product of an epoxy resin and an amine compound having at least one sulfur atom in the molecule is preferred to be contained as component (D) in the epoxy resin composition, since the viscosity of the epoxy resin composition can be adjusted. Namely, by adjusting reaction conditions for the epoxy resin and the amine compound having at least one sulfur atom in the molecule, for example, by setting a higher temperature for a longer time, the viscosity of the obtained reaction product increases, while by setting a lower temperature for a shorter time, the viscosity of the obtained reaction product decreases. As a result, when an epoxy resin containing a reaction product with a desired viscosity is combined as component (D) into an epoxy resin composition, the viscosity of the epoxy resin composition is preferably adjusted.

Component (D) may also be an epoxy resin having at least one sulfur atom in the molecule, and having the structure represented by formula (4) below.

[chemical formula 12]

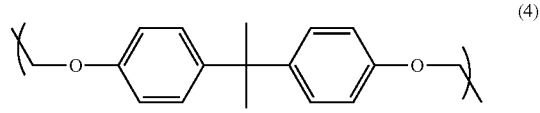

(4)

Examples of such an epoxy resin are reaction products of a bisphenol A epoxy resin and the aforementioned amine compound having at least one sulfur atom in the molecule.

When component (D) is contained in the epoxy resin composition of a preferred embodiment of the present invention, the amount in a mass ratio of component (A) to component (D) is preferred to be 95:5~10:90, more preferably 80:20~12:88, even more preferably 60:40~13:87. The mass ratio of component (A) to component (D) is preferred to be 95:5~10:90, since such a setting enhances heat tolerance of the cured resin. The mass ratio of component (A) and component (D) is preferred to be set at 95:5~10:90, since this increases the heat tolerance of the cured resin.

In a preferred embodiment of the prepreg according to the present invention, the total amount of component (A) and component (D) in the epoxy resin composition is preferred to be 70~98 parts by mass, more preferably 80~98 parts by mass, based on 100 parts by mass of the epoxy resin composition. The amount of component (A) in the epoxy resin composition is preferred to be 70~98 parts by mass, since this produces a high-density crosslinking structure in the cured products.

(Curing Additive)

In a preferred embodiment of the prepreg according to the present invention, to enhance the curing activity of component (B) or (C) in an epoxy resin composition, the epoxy resin composition may include a curing additive within a range that does not cause deviation from the gist of the present invention. Since the prepreg is cured in an even shorter period of time by using an epoxy resin composition that contains a curing agent combined with component (B) or (C), such an epoxy resin composition is more preferable for producing a fiber-reinforced composite material. However, if too much curing additive is added to the epoxy resin composition, that may result in lowered heat tolerance of the cured resin composition or degraded storage stability of the prepreg. Thus, the amount should be kept low.

Examples of a curing additive are urea derivatives such as 3-phenyl-1,1-dimethylurea, 3-(3,4-dichlorophenyl)-1,1-dimethylurea) (DCMU), 3-(3-chloro-4-methylphenyl)-1,1-dimethylurea, and 2,4-bis(3,3-dimethylureido)toluene, or amine complexes such as tertiary amine, boron trifluoride monoethylamine, and boron trichloride amine complex.

(Other Curing Agent)

Also, regarding a preferred embodiment of the prepreg according to the present invention, an epoxy resin composition may be prepared by combining an "other curing agent" that is not component (B) or component (C), within a range that does not cause deviation from the gist of the present invention. However, it is noted that since the "other curing agent" with excellent curing capability at low temperature generally reduces the shelf life of the epoxy resin composition and prepreg, namely, the storable period of the prepreg, while retaining the tackiness and flexibility properties of the prepreg, the amount of such a curing agent should be kept low.

(Additive)

In addition, in an embodiment of the present invention, one or more resins selected from among a group of thermoplastic resins, thermoplastic elastomers, and elastomers may be contained in the epoxy resin composition as an additive. Such an additive changes the viscoelasticity of an epoxy resin composition to provide appropriate viscosity, storage modulus and thixotropic properties, while enhancing the plasticity of the cured epoxy resin composition. One or more resins selected from among a group of thermoplastic resins, thermoplastic elastomers, and elastomers to be added to an epoxy resin composition may be used alone or in combination thereof. In addition, one or more resins selected from among a group of thermoplastic resins, thermoplastic elastomers, and elastomers may be made into particles, long fibers, short fibers, fabric, nonwoven fabric, mesh, pulp and the like and arranged on a surface layer of a prepreg. When such one or more resins selected from among a group of thermoplastic resins, thermoplastic elastomers, and elastomers are arranged on a surface of the prepreg of the present embodiment, interlayer peeling is suppressed in the fiber-reinforced composite material obtained by curing the prepreg.

In the present embodiment, when an epoxy resin composition contains one or more resins selected from among a group of thermoplastic resins, thermoplastic elastomers, and elastomers, the amount of the additive in the epoxy resin composition is preferred to be 1~15 parts by mass, more preferably 2~10 parts by mass, based on 100 parts by mass of epoxy resin (component (A), or the sum of component (A) and component (D) when component (D) is contained in the epoxy resin composition). The amount of additive in an epoxy resin composition is preferred to be 1~15 parts by mass, since it is easier to mix such an amount of additive into the epoxy resin composition. In the present embodiment, if two or more additives are added to an epoxy resin composition, the total amount of multiple additives in the epoxy resin composition is preferred to be in the above range.

Preferred examples of a thermoplastic resin in the present embodiment are those having a main chain selected from among a group of carbon-carbon bond, amide bond, imide bond, ester bond, ether bond, carbonate bond, urethane bond, urea bond, thioether bond, sulfone bond, imidazole bond, and carbonyl bond. Among those, thermoplastic resins that belong to engineering plastic groups such as below are preferred to be used: polyacrylate, polyamide, polyaramide, polyester, polycarbonate, polyphenylene sulfide, polybenzimidazole, polyimide, polyether imide, polysulfone, polyether sulfone, and the like. Among those, polyimide, polyether imide, polysulfone and polyether sulfone are especially preferred to be used. Such an additive is preferred to be used in an epoxy resin composition, since heat tolerance of the cured resin is improved. Also, to enhance the plasticity of the cured product of an epoxy resin composition and resistance to the environment of the cured resin, those thermoplastic resins are preferred to have a functional group capable of reacting with a thermosetting resin. Examples of such a functional group are carboxyl groups, amino groups and hydroxyl groups.

<Method for Producing Epoxy Resin Composition>

The epoxy resin composition used for the prepreg in an embodiment of the present invention is produced using a method known in the art. For example, it is preferred to be produced using a glass flask, kneader, planetary mixer, generally used heating agitator oven, heating pressure agitator oven or the like.

The epoxy resin composition used for prepreg of the present embodiment is preferred to be produced in a method that includes the following steps, for example.

Step (1): Epoxy resin (component (A), or the sum of components (A) and (D) when component (D) is contained) and an additive such as a thermoplastic resin are fed into a dissolution vessel, and the mixture is heated for 1~6 hours at 70~150° C. to obtain an epoxy resin base material.

Step (2): After the epoxy resin base material is cooled to 50~70° C., component (B) and/or component (C), another curing agent, and a curing additive are added and mixed at 50~70° C. for 0.5~2 hours to obtain an epoxy resin composition.

<Producing Prepreg>

The prepreg according to an embodiment of the present invention is produced by impregnating a reinforcing fiber bundle with the epoxy resin composition. In the method for producing prepreg according to the present embodiment, the epoxy resin composition may also be impregnated into reinforcing fiber by the following methods, for example: the epoxy resin composition is applied on a carrier sheet such as a releasing paper to form a film, which is then paired with reinforcing fiber bundles or a sheet made of reinforcing fiber bundles, heat pressed appropriately, namely, heated to 80~120° C. and pressed between nip rolls; or the epoxy resin composition of the present embodiment is directly applied on reinforcing fiber bundles or a sheet made of reinforcing fiber bundles and heat pressed the same as above.

The prepreg of the present embodiment has excellent storage stability at room temperature, and has appropriate tackiness properties, namely, it is easy for the prepreg to adhere to and be removed from another prepreg or from the surface of a molding die. Thus, the prepreg is suitably used for fiber-reinforced composite material with a complex shape.

(Reinforcing Fiber)

Reinforcing fiber to be impregnated with the epoxy resin composition of the present embodiment is not limited to any specific type. For example, carbon fiber, graphite fiber, fiber glass, organic fiber, boron fiber, steel fiber and the like may be used in a form of tow, cloth, chopped fiber, mat or the like.

Among those reinforcing fibers, carbon fiber and graphite fiber are preferred because of their excellent specific modulus, namely, an elastic modulus of 200 GPa or higher in a direction of fiber orientation, and significant effects to form lightweight fiber-reinforced composite material. Also, various types of carbon fiber or graphite fiber may be used according to usage purposes.

<Fiber-Reinforced Composite Material>

By heat press curing the prepreg related to the present invention under predetermined conditions, a fiber-reinforced composite material is obtained.

Methods for producing fiber-reinforced composite material using the prepreg related to the present invention are autoclave molding, vacuum bag molding, compression molding and the like. Among them, compression molding is preferred, because high-quality fiber-reinforced composite material is obtained at high productivity while maximizing the characteristics of an epoxy resin composition that is preferred to be used for producing the prepreg according to the present invention. When a fiber-reinforced composite material is produced by compression molding, such a method is preferred to include a step for heat pressing the prepreg related to the present embodiment or a preform made by laminating the prepreg related to the present invention in a die preheated to a predetermined curing temperature.

The temperature in the die during compression molding is preferred to be 100~150° C. In addition, curing is preferred to be conducted for 1~20 minutes under a pressure of 1~15 MPa.

When a fiber-reinforced composite material is produced using the aforementioned conditions in the compression molding above, to avoid unwanted deformation while removing the compression-molded fiber-reinforced composite material from the die, the glass transition temperature of the cured fiber-reinforced composite material, especially, G'Tg determined as a temperature at which the storage shear modulus starts lowering, is preferred to be higher than the die temperature during molding. That is, when the prepreg obtained by impregnating reinforcing fiber bundles with the epoxy resin composition is pressed and kept for 5 minutes in a die preheated at 140° C. under a pressure of 1 MPa, the G'Tg of the obtained fiber-reinforced composite material is preferred to be 150° C. or higher. Namely, the prepreg related to the present invention contains reinforcing fiber and the epoxy resin composition, and a fiber-reinforced composite material is preferred to be produced using such a prepreg that exhibits a G'Tg of 150° C. or higher when the prepreg is cured by being pressed and kept for 5 minutes in a die preheated at 140° C. under a pressure of 1 MPa. Fiber-reinforced composite material is preferred to be produced using such prepreg. G'Tg means a glass transition temperature determined by a later-described method from the temperature-dependent response of the storage shear modulus (G') obtained by measuring the dynamic viscoelasticity of the cured product.

The application of fiber-reinforced composite materials made of the prepreg related to the present invention is not limited specifically, but fiber-reinforced composite materials are used as structural material for airplanes, and for automobiles, marine vessels, sporting goods, and other general industrial purposes such as windmills, rolls and the like.

EXAMPLES

Examples of the present invention are described in detail below. However, the present invention is not limited to those examples.

Example 1

(1) Preparing Epoxy Resin Composition

As component (A), 50 parts by mass of bisphenol A epoxy resin (epoxy equivalent weight of 189 g/eq, brand name: jER 828, made by Mitsubishi Chemical Corp.) (denoted as "A-1" in Table 1); as component (D), 50 parts by mass of bisphenol S epoxy resin (epoxy equivalent weight of 300 g/eq, brand name: EXA-1514, made by DIC Corp.) (denoted as "D-1" in Table 1); and as an additive, 5 parts of polyether sulfone (weight average molecular weight of 32,000, brand name: Ultrason E2020P, made by BASF Corp.) (denoted as "Z-2" in Table 1) were fed into a glass flask, and mixed while heated at 100° C. Accordingly, a homogeneous epoxy resin base material was obtained. Next, the obtained epoxy resin base material was cooled to be 60° C. or lower. Then, as component (B), 10 parts by mass of 2-phenyl-4-methyl-5-hydroxymethyl imidazole (brand name: 2P4 MHZ-PW, made by Shikoku Chemicals Corp.) (denoted as "B-1 in Table 1); and as component (C), 5 parts by mass of HX 3722 (curing agent content of 35%; brand name: Novacure HX 3722, made by Asahi Kasei E-Materials Corp.) (denoted as "C-1" in Table 1) were added and mixed at 60° C. to disperse the mixture homogeneously. Accordingly, an epoxy resin composition was obtained.

(2) Preparing Cured Resin Sheet

The obtained epoxy resin composition was injected between two 4-mm thick glass plates with a 2-mm thick spacer made of polytetrafluoroethylene, which was then heated for 10 minutes in a thermostatic oven with circulating hot air under conditions to raise the temperature of the glass surfaces to 140° C., and cooled to obtain a cured resin sheet.

(3) Producing Prepreg

The epoxy resin composition obtained in (1) was homogeneously applied on a releasing paper using a comma coater at a resin basis weight of 133 g/m² to form a resin layer. Then, on the resin layer, 3K plain-weave carbon-fiber TR 3110M, made by Mitsubishi Rayon Co., Ltd., was laminated and heat pressed at a temperature of 80° C. and a set pressure of 0.4 MPa using a fusing press (brand name: JR-600S, made by Asahi Corp., treatment length of 1,340 mm, set pressure exerted by a cylinder) so as to impregnate the carbon fiber with the epoxy resin composition. Accordingly, prepreg for compression molding with a fiber basis weight of 200 g/m² and a resin content of 40 mass % was obtained to be ready for compression molding.

(4) Producing Fiber-Reinforced Composite Material

The prepreg for compression molding obtained in (3) was cut into a 298 mm×298 mm sheet. Then, a preform (1.1 mm thick, layer volume of 97.7 cm³, single-side surface area of 888 cm²) was prepared by alternately laminating five sheets in such a way to set the vertical fiber orientation at 0° and 90°.

Figure 1B:
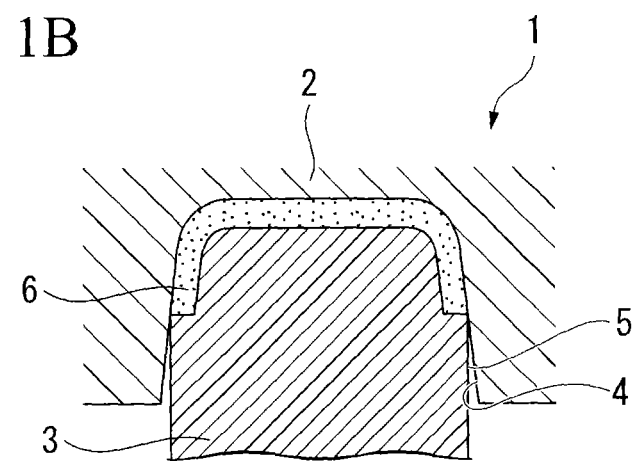
FIG. 1B is a cross-sectional view showing a closed state of the compression-molding die for producing a fiber-reinforced composite material formed using an epoxy resin composition related to the present invention.

A die 1 shown in FIGS. 1A and 1B was used as the compression-molding die. The lower die 3 of the die 1 that makes contact with the preform has a surface area of 900 cm² (excluding the surface that makes contact with the thickness portions of the fiber-reinforced composite material).

First, the upper die 2 and lower die 3 of the die 1 were preheated at 140° C., the preform was placed on the lower die 3, and the upper die 2 was immediately lowered to close the die 1. Then, the die 1 was heated for 5 minutes by exerting a pressure of 10 MPa. After that, the molded product was taken out of the die 1 to obtain a fiber-reinforced composite material.

The rate of resin flowing out from the shearing edge of the die was calculated by the formula below.

resin outflow rate(%)=($W1$ −$W2$)/$W1$×100

W1=mass (g) of preform before curing
W2=mass (g) of molded product (after deburring)
(5) Measuring Heat Tolerance (Glass Transition Temperature: G'Tg)

The resin sheet obtained in (2) and the fiber-reinforced composite material obtained in (4) were cut into test pieces (55 mm long×12.5 mm wide), and the values of log G' were plotted in relation to temperature using Rheometer ARES-RDA, made by TA Instruments, under conditions of frequency at 1HZ and a programmed rate of temperature rise at 5° C./min. Then, the temperature at a point where the approximate straight line in a flat region of log G' crosses the approximate straight line in a region where log G' declines drastically was recorded as the glass transition temperature (G'Tg).

(6) Evaluation of the Shelf Life of Prepreg

The prepreg obtained in (3) was left standing still for three weeks in a laboratory set at a temperature of 23±2° C. and a humidity of 50±5% and observed by finger touch. The shelf life of the prepreg was evaluated as follows.
 A: appropriate tackiness and softness, easy to handle.
 B: poor tackiness or less softness, hard to handle.
 C: significantly poor tackiness, lack of softness, hard to handle Examples 1~28, Comparative Examples 1~25

Fiber-reinforced composite materials were each prepared in each of Examples 1~28 and Comparative Examples 1~25 by the same procedures taken in Example 1 except that the components of the epoxy resin composition were respectively changed as described in Tables 1~4, and physical properties of each fiber-reinforced composite material were measured. In Tables 1~4, "amount of component (B)" means the total amount of component (B) in each epoxy resin composition. Also, "amount of component (C)" means the total amount of component (C) in each epoxy resin composition. When a masterbatch curing agent encapsulated in microcapsules was used as component (C), the amount of component (C) was measured by multiplying the added amount of the masterbatch curing agent and the proportion of the curing agent content (%) in the masterbatch.

The abbreviations denoted in Tables 1~4 are as follows.
Component (A): Epoxy Resin that does not Contain a Sulfur Atom in the Molecule
A-1: bisphenol A epoxy resin (epoxy equivalent weight of 189 g/eq, brand name: jER828, made by Mitsubishi Chemical Corp.)
A-2: bisphenol A epoxy resin (epoxy equivalent weight of 475 g/eq, brand name: jER1001, made by Mitsubishi Chemical Corp.)
A-3: dicyclopentadiene epoxy resin (epoxy equivalent weight of 265 g/eq, brand name: HP7200, made by DIC Corp.)
A-4: trisphenylmethane epoxy resin (epoxy equivalent weight of 169 g/eq, brand name: jER1032, made by Mitsubishi Chemical Corp.)
A-5: diaminodiphenylmethane epoxy resin (epoxy equivalent weight of 120 g/eq, brand name: jER604, made by Mitsubishi Chemical Corp.)
A-6: liquid phenol novolac epoxy resin (epoxy equivalent weight of 177 g/eq, brand name: jER152, made by Mitsubishi Chemical Corp.)
A-7: bisphenol F epoxy resin (epoxy equivalent weight of 168 g/eq, brand name: jER807, made by Mitsubishi Chemical Corp.)
A-8: epoxy resin having naphthalene skeleton (epoxy equivalent weight of 150 g/eq, brand name: HP4032, made by DIC Corp.)
A-9: epoxy resin having oxazolidone ring (epoxy equivalent weight of 189 g/eq, brand name: AER4152, made by Asahi Kasei E-Materials Corp.)
Component (B): Imidazole Compound Represented by Formula (1)
B-1: 2-phenyl-4-methyl-5-hydroxymethyl imidazole (brand name: 2P4 MHZ-PW, made by Shikoku Chemicals Corp.)
B-2: 2-phenyl-4,5-dihydroxymethyl imidazole (brand name: 2PHZ-PW, made by Shikoku Chemicals Corp.)
Component (C): Imidazole Compound Represented by Formula (2)
The following masterbatch curing agents containing component (C) encapsulated in microcapsules were used.
C-1: HX3722 (curing agent content of 35%, brand name: Novacure HX3722, made by Asahi Kasei E-Materials Corp.)
C-2: HX3748 (curing agent content of 35%, brand name: Novacure HX3748, made by Asahi Kasei E-Materials Corp.)
Component (D): Epoxy Resin Having at Least One Sulfur Atom in the Molecule.
D-1: bisphenol S epoxy resin (epoxy equivalent weight of 300 g/eq, brand name: EXA-1514, made by DIC Corp.)
D-2: reaction product of A-1 and 4,4'-diaminodiphenylsulfone
 Reaction product of A-1 and 4,4'-diaminodiphenylsulfone (brand name: Seikacure-S, made by Seika Corp.) obtained by combining at a mass ratio of A-1:4,4'-Diaminodiphenylsulfone=100:9 at room temperature, and by mixing and heating the mixture at 150° C. A mixture (epoxy equivalent weight of 266 g/eq) mainly contains a reaction product of the epoxy resin and an amine compound having at least one sulfur atom in the molecule.
Curing Additive (X):
X-1: 3-phenyl-1,1-dimethylurea (brand name: Omicure 94, made by PTI Japan Corp.)
X-2: 1,1'-(4-methyl-1,3-phenylene)-bis-(3,3-dimethylurea) (brand name: Omicure 24, made by PTI Japan Corp.)
X-3: 4,4'-methylenebis(phenyldimethylurea) (brand name: Omicure 52, made by PTI Japan Corp.)
Other Curing Agent (Y):
Y-1: 2,4-diamino-6-[2'-undecyl imidazolyl-(1')]-ethyl-s-triazine (brand name: C11Z-A, made by Shikoku Chemicals Corp.)

Y-2: isocyanuric acid adduct of 2,4-diamino-6-[2'-methyl imidazolyl-(1')]-ethyl-s-triazine (brand name: 2MA-OK, made by Shikoku Chemicals Corp.)
Y-3: dicyandiamide (brand name: DICY15, made by Mitsubishi Chemical Corp.)
Y-4: 2-methylimidazole (brand name: 2MZ-H, made by Shikoku Chemicals Corp.)
Y-5: 1,2-dimethylimidazole (brand name: 1, 2DMZ, made by Shikoku Chemicals Corp.)
Y-6: 2,4-diamino-6-[2'-methylimidazolyl-(1')]-ethyl-s-triazine (brand name: 2MZ-A, made by Shikoku Chemicals Corp.)
Y-7: N-benzyl-2-methylimidazole (made by Tokyo Chemical Industry Co., Ltd.)
Y-8: 1-(2-hydroxyethyl)-2-methylimidazole (made by Nippon Synthetic Chemical Industry Co., Ltd.)
Y-9: isophthalic acid dihydrazide (brand name: IDH-S, made by Otsuka Chemical Co., Ltd.)

Thermoplastic Resin (Z) Used as Additive:

Z-1: phenoxy resin (brand name: Pheno Tohto YP-50S, weight average molecular weight 50,000~70,000, made by Nippon Steel Chemical Co., Ltd.)
Z-2: polyether sulfone (brand name: Ultrason E2020P, made by BASF Corp., weight average molecular weight 32,000)

3K plain-weave carbon-fiber fabric: brand name TR3110M, made by Mitsubishi Rayon Co., Ltd.

TABLE 1

(parts by mass)

| | | example 1 | example 2 | example 3 | example 4 | example 5 | example 6 | example 7 |
|---|---|---|---|---|---|---|---|---|
| component A | A-1 | 50.0 | | 25.0 | 37.0 | 25.0 | 25.0 | 10.0 |
| | A-2 | | | | | | | |
| | A-3 | | | | | | | |
| | A-4 | | 20.0 | | | | | |
| | A-5 | | 20.0 | | | | | |
| | A-6 | | 60.0 | | | | | |
| component D | D-1 | 50.0 | | | | | | |
| | D-2 | | | 75.0 | 63.0 | 75.0 | 75.0 | 90.0 |
| amount of epoxy resin (component A + component D) | | 100.0 | 100.0 | 100.0 | 100.0 | 100.0 | 100.0 | 100.0 |
| component B | B-1 | 10.0 | 8.7 | | | | | |
| | B-2 | | | 8.7 | 4.3 | 8.7 | 8.7 | 15.0 |
| amount of component B | | 10.0 | 8.7 | 8.7 | 4.3 | 8.7 | 8.7 | 15.0 |
| component C | C-1 | 5.0 | | 10.0 | 5.0 | 5.0 | 3.0 | |
| | C-2 | | 5.0 | | | | | 10.0 |
| amount of component C | | 1.75 | 1.75 | 3.50 | 1.75 | 1.75 | 1.05 | 3.50 |
| other curing agent: (Y) | Y-1 | | | | | | | |
| | Y-2 | | | | | | | |
| | Y-3 | | | | | | | |
| curing additive: (X) | X-1 | | | | | | | |
| | X-2 | | | | | | | |
| | X-3 | | | | | | | |
| additive: (Z) | Z-1 | | | | | | | |
| | Z-2 | 5.0 | | 2.6 | 7.0 | 2.6 | 2.6 | |
| G' Tg (° C.) | | 172 | 155 | 164 | 165 | 164 | 164 | 163 |
| shelf life of prepreg | | A | A | A | A | A | A | A |
| resin outflow rate (%) | | 1.1 | 1.1 | 0.8 | 0.8 | 0.8 | 0.9 | 0.5 |

| | | example 8 | example 9 | example 10 | example 11 | example 12 | example 13 | example 14 |
|---|---|---|---|---|---|---|---|---|
| component A | A-1 | 30.0 | 30.0 | 13.0 | 20.6 | 13.0 | 13.0 | 25.0 |
| | A-2 | 70.0 | 70.0 | | | | | |
| | A-3 | | | | | | | |
| | A-4 | | | | | | | |
| | A-5 | | | | | | | |
| | A-6 | | | | | | | |
| component D | D-1 | | | | | | | |
| | D-2 | | | 87.0 | 79.4 | 87.0 | 87.0 | 75.0 |
| amount of epoxy resin (component A + component D) | | 100.0 | 100.0 | 100.0 | 100.0 | 100.0 | 100.0 | 100.0 |
| component B | B-1 | 3.0 | | 4.3 | 4.3 | | | 1.0 |
| | B-2 | | 10.0 | | | 4.3 | 8.7 | 8.7 |
| amount of component B | | 3.0 | 10.0 | 4.3 | 4.3 | 4.3 | 8.7 | 9.7 |
| component C | C-1 | 15.0 | 5.0 | | | | | |
| | C-2 | | | | | | | |
| amount of component C | | 5.25 | 1.75 | 0.00 | 0.00 | 0.00 | 0.00 | 0.00 |
| other curing agent: (Y) | Y-1 | | | | | | | |
| | Y-2 | | | | | | | |
| | Y-3 | | | | | | | |
| curing additive: (X) | X-1 | | | | | | | |
| | X-2 | | | | | | | |
| | X-3 | | | | | | | |
| additive: (Z) | Z-1 | | | | | | | |
| | Z-2 | | | | 7.0 | | | |

TABLE 1-continued (parts by mass)

| | | | | | | | |
|---|---|---|---|---|---|---|---|
| G' Tg (° C.) | 139 | 136 | 170 | 170 | 170 | 171 | 168 |
| shelf life of prepreg | A | A | A | A | A | A | A |
| resin outflow rate (%) | 1.2 | 1.2 | 2.7 | 1.6 | 7.0 | 3.6 | 2.0 |

TABLE 2

(parts by mass)

| | | comparative example 1 | comparative example 2 | comparative example 3 | comparative example 4 | comparative example 5 | comparative example 6 | comparative example 7 | comparative example 8 | comparative example 9 | comparative example 10 | comparative example 11 |
|---|---|---|---|---|---|---|---|---|---|---|---|---|
| component A | A-1 | 13.0 | 30.0 | 20.6 | | 4.0 | 13.0 | 13.0 | 21.9 | 28.4 | 30.0 | 30.0 |
| | A-2 | | 70.0 | | | | | | | | | 70.0 |
| | A-3 | 87.0 | | | | | | | | | | |
| | A-4 | | | | | | | | | | | |
| | A-5 | | | | | | | | | | | |
| | A-6 | | | | | | | | | | | |
| component D | D-1 | | | | | | | | | | | |
| | D-2 | | | 79.4 | 100.0 | 96.0 | 87.0 | 87.0 | 78.1 | 71.6 | 70.0 | |
| amount of epoxy resin (component A + component D) | | 100.0 | 100.0 | 100.0 | 100.0 | 100.0 | 100.0 | 100.0 | 100.0 | 100.0 | 100.0 | 100.0 |
| component B | B-1 | 4.3 | | 4.3 | | | | | | | | |
| | B-2 | | 10.0 | | | | | | | | | |
| amount of component B | | 4.3 | 10.0 | 4.3 | 0.0 | 0.0 | 0.0 | 0.0 | 0.0 | 0.0 | 0.0 | 0.0 |
| component C | C-1 | | | | | | | | | | 15.0 | 15.0 |
| | C-2 | | | | 28.0 | 28.0 | | | | | | |
| amount of component C | | 0.00 | 0.00 | 0.00 | 9.80 | 9.80 | 0.00 | 0.00 | 0.00 | 0.00 | 5.25 | 5.25 |
| other curing agent: (Y) | Y-1 | | | | | | 8.7 | | | | | |
| | Y-2 | | | | | | | 8.7 | | | | |
| | Y-3 | | | | | | | | 5.5 | 5.4 | | |
| curing additive: (X) | X-1 | | | | | | | | 4.1 | 4.1 | | |
| | X-2 | | | | | 4.0 | | | | | | |
| | X-3 | | | 1.0 | | | | | | | | |
| additive: (Z) | Z-1 | | | | | | | | | 9.1 | | |
| | Z-2 | | | 7.0 | | | | | | | | |
| G' Tg (° C.) | | 55 | 142 | 152 | 50 | 128 | 135 | 145 | 125 | 125 | 40 | 40 |
| shelf life of prepreg | | A | A | C | A | C | C | A | A | A | A | A |
| resin outflow rate (%) | | 4.5 | 5.0 | 0.9 | 0.8 | 1.1 | 1.4 | 4.1 | 9.3 | 1.4 | 1.0 | 1.1 |

TABLE 3

(parts by mass)

| | | example 15 | example 16 | comparative example 12 | comparative example 13 | comparative example 14 | comparative example 15 | comparative example 16 | comparative example 17 |
|---|---|---|---|---|---|---|---|---|---|
| component A | A-1 | 25.0 | 25.0 | 100.0 | 25.0 | 25.0 | 25.0 | 25.0 | 25.0 |
| component D | D-2 | 75.0 | 75.0 | | 75.0 | 75.0 | 75.0 | 75.0 | 75.0 |
| amount of epoxy resin (component A + component D) | | 100.0 | 100.0 | 100.0 | 100.0 | 100.0 | 100.0 | 100.0 | 100.0 |
| component B | B-2 | 8.7 | 8.7 | 8.7 | 8.7 | 8.7 | 8.7 | 8.7 | 8.7 |
| component C | C-1 | 10.0 | | | | | | | |
| amount of component C | | 3.50 | 0.00 | 0.00 | 0.00 | 0.00 | 0.00 | 0.00 | 0.00 |
| other curing agent: (Y) | Y-4 | | | | 10.0 | | | | |
| | Y-5 | | | | | 10.0 | | | |
| | Y-6 | | | | | | 10.0 | | |
| | Y-7 | | | | | | | 10.0 | |
| | Y-8 | | | | | | | | 10.0 |
| G' Tg (° C.) | | 167 | 173 | not cured | 167 | 158 | 143 | 160 | 173 |
| shelf life of prepreg | | A | A | A | C | C | C | C | C |

TABLE 4

(parts by mass)

| | | example 17 | example 18 | example 19 | example 20 | example 21 | example 22 | example 23 | example 24 | example 25 | example 26 |
|---|---|---|---|---|---|---|---|---|---|---|---|
| component A | A-1 | 50.0 | 25.0 | | 10.0 | 50.0 | | 70.0 | 90.0 | 95.0 | 50.0 |
| | A-7 | | | 70.0 | | | | | | | |
| | A-8 | | | | | | 25.0 | | | | |
| | A-2 | | | | | | | | | | |
| | A-9 | | | | | | | | | | |
| | A-4 | | | | | | | | | | |
| | A-5 | | | | | | | | | | |
| | A-6 | | | | | | | | | | |
| component D | D-1 | 50.0 | | 30.0 | | | | 30.0 | 10.0 | 5.0 | 50.0 |
| | D-2 | | 75.0 | | 90.0 | 50.0 | 75.0 | | | | |
| amount of epoxy resin (component A + component D) | | 100.0 | 100.0 | 100.0 | 100.0 | 100.0 | 100.0 | 100.0 | 100.0 | 100.0 | 100.0 |
| component B | B-1 | 10.0 | 3.0 | 15.0 | | | 8.7 | 10.0 | 10.0 | 10.0 | 20.0 |
| | B-2 | | | | 5.0 | 15.0 | | | | | |
| amount of component B | | 10.0 | 3.0 | 15.0 | 5.0 | 15.0 | 8.7 | 10.0 | 10.0 | 10.0 | 20.0 |
| curing additive: (X) | X-2 | | | | | | | | | | |
| other curing agent: (Y) | Y-6 | | | | | | | | | | |
| | Y-9 | | | | | | | | | | |
| | Y-3 | | | | | | | | | | |
| additive: (Z) | Z-1 | | | | | | | | | | |
| G' Tg (° C.) | | 171 | 169 | 162 | 165 | 169 | 171 | 160 | 155 | 154 | 162 |

| | | example 27 | example 28 | comp. example 18 | comp. example 19 | comp. example 20 | comp. example 21 | comp. example 22 | comp. example 23 | comp. example 24 | comp. example 25 |
|---|---|---|---|---|---|---|---|---|---|---|---|
| component A | A-1 | 50.0 | 50.0 | 40.0 | 50.0 | | 13.0 | 28.0 | 13.0 | 21.9 | 28.4 |
| | A-7 | | | | | | | | | | |
| | A-8 | | | | | | | | | | |
| | A-2 | | | 60.0 | | | | | | | |
| | A-9 | | | | 50.0 | | | | | | |
| | A-4 | | | | | 20.0 | | | | | |
| | A-5 | | | | | 20.0 | | | | | |
| | A-6 | | | | | 60.0 | | | | | |
| component D | D-1 | 50.0 | 50.0 | | | | | | | | |
| | D-2 | | | | | | 87.0 | 72.0 | 87.0 | 78.1 | 71.6 |
| amount of epoxy resin (component A + component D) | | 100.0 | 100.0 | 100.0 | 100.0 | 100.0 | 100.0 | 100.0 | 100.0 | 100.0 | 100.0 |
| component B | B-1 | 30.0 | 40.0 | 15.0 | | 8.7 | | | | | |
| | B-2 | | | | 7.5 | | | | | | |
| amount of component B | | 30.0 | 40.0 | 15.0 | 7.5 | 8.7 | 0.0 | 0.0 | 0.0 | 0.0 | 0.0 |
| curing additive: (X) | X-2 | | | | | | | | | 4.1 | 4.1 |
| other curing agent: (Y) | Y-6 | | | | | | 8.7 | | | | |
| | Y-9 | | | | | | | 16.1 | 14 | | |
| | Y-3 | | | | | | | | | 5.5 | 5.4 |
| additive: (Z) | Z-1 | | | | | | | | | | 9.1 |
| G' Tg (° C.) | | 158 | 156 | 147 | not cured | 135 | 149 | not cured | 105 | 139 | 139 |

As found in Tables 1~4, the prepregs respectively obtained in Examples 1~16 each showed excellent storage stability. Also, the prepregs in Examples 1~16 each showed a high G'Tg. Judging from those results, the fiber-reinforced composite material produced using the prepreg according to the present invention was found to have high heat tolerance.

By contrast, comparative Example 1 showed a low G'Tg in the cured fiber-reinforced composite material, and deformation was observed in a molded product while it was released from the die because of low rigidity of the molded products. Accordingly, to obtain a non-deformed product, the molded product was required to be cooled before being released from the die. Thus, it was found difficult to perform high-cycle molding of the fiber-reinforced composite material.

Also, in comparative Examples 1, 12, and 18~20 that contain neither component (C) nor (D), each showed a low heat tolerance (G'Tg), and in comparative Examples 1 and 2, excessive amount of resin flowed out during the heat-press curing process. In addition, in comparative Examples 4~11 and 21~25 prepared without component (B), heat tolerance was low. Furthermore, in comparative Examples 7 and 8, which do not contain component (C) as well, an excessive amount of resin flowed out during the heat-press curing process. In comparative Examples 3, and 13~17, due to high contents of other curing agents and curing additives, the storage stability of the prepreg was low.

On the other hand, compared with Examples 27 and 28, Examples 26 and 17 showed high heat tolerance, and Example 17 showed the highest heat tolerance. Also, it was found that heat tolerance was even higher in Example 18 than in comparative Example 24. From those results, it is found that the amount of component (B) contained in the epoxy resin composition is preferred to be 2~40 parts by mass based on 100 parts by mass of epoxy resin (when component (D) is contained, the total 100 parts by mass of component (D) and component (A)).

Compared with Example 14, Example 6 showed a preferable result of low resin outflow rate at 0.9%, and Example 3 showed a more preferable result of an even lower resin outflow rate at 0.8%. Also, compared with Example 14, Example 8 showed a preferable result of a low resin outflow rate at 1.2%. From those test results, it is found that the amount of component (C) contained in the epoxy resin composition is preferred to be 1~6 parts by mass based on 100 parts by mass of epoxy resin (when component (D) is contained, the total 100 parts by mass of component (D) and component (A)).

Compared with Example 25, Example 23 showed a preferable result of high heat tolerance, and Example 17 showed a preferable result of even higher heat tolerance. Also, compared with Example 20, Example 12 showed a preferable result in heat tolerance. From those test results, it was found that the amount of compound (D) to be added is preferred to be set at 95:5~10:90 in a mass ratio of component (A) to component (D).

POTENTIAL INDUSTRIAL APPLICATION

The prepreg according to the embodiments of the present invention is suitably used in press molding, especially, high-cycle press molding.

DESCRIPTION OF NUMERICAL REFERENCES 1 die
2 upper die
3 lower die
4 female portion of shearing edge
5 male portion of shearing edge
6 molding material

What is claimed is:
1. A prepreg, comprising:
a reinforcing fiber; and
an epoxy resin composition comprising a component (A), a component (B), a component (D), and a component (C) as an optional component,
wherein:
the component (A) is an epoxy resin that does not include a sulfur atom in the molecule:
the component (B) is an imidazole compound represented by formula (1):

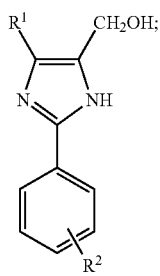

(1)

$R^1$ represents a straight-chain or branched-chain alkyl group or hydroxymethyl group having 1-5 carbon atoms;

$R^2$ represents a hydrogen atom or a straight-chain or branched-chain alkyl group having 1-5 carbon atoms;

the component (C) is an imidazole compound represented by formula (2):

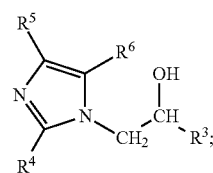

(2)

$R^3$ represents an organic group containing at least one carbon atom, and $R^4$~$R^6$ represent a hydrogen atom, a methyl group or an ethyl group;

the component (D) is an epoxy resin that includes at least one sulfur atom in its molecule; and an amount of the component (B) in the epoxy resin composition is 2~40 parts by mass based on the total 100 parts by mass of the component (A) and the component (D), provided that a curing agent other than the components (A) to (D) is not included in the epoxy resin composition.

2. The prepreg according to claim 1, wherein the epoxy resin composition comprises the component (C).

3. The prepreg according to claim 2, wherein the component (C) is an imidazole compound encapsulated in microcapsules.

4. The prepreg according to claim 2, wherein a mass ratio of the component (A) to the component (D) in the epoxy resin composition is 95:5~10:90.

5. The prepreg according to claim 4, wherein the component (D) comprises a structure represented by formula (3):

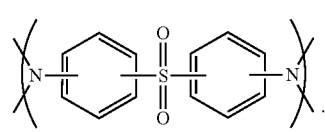

(3)

6. The prepreg according to claim 5, wherein the component (D) comprises a structure represented by formula (4):

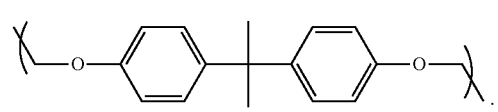

(4)

7. The prepreg according to claim 6, wherein the component (D) comprises a reaction product of the epoxy resin and an amine compound having at least one sulfur atom in its molecule.

8. The prepreg according to claim 4, wherein the component (D) comprises a structure represented by formula (4):

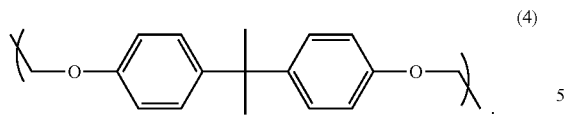 (4)

9. A fiber-reinforced composite material obtained by a process comprising curing the prepreg according to claim 1.

10. A method for producing a fiber-reinforced composite material, the method comprising:
   pressing the prepreg according to claim 1 in a die for 1~20 minutes under a temperature of 100~150° C. and a pressure of 1~15 MPa.

11. The prepreg according to claim 1, wherein the prepreg in cured form has a glass transition temperature of 150° C. or higher when the prepreg is cured by being pressed for 5 minutes in a die preheated at 140° C. under a pressure of 1 MPa.

* * * * *